(12) United States Patent
Moisand et al.

(10) Patent No.: US 8,542,592 B2
(45) Date of Patent: *Sep. 24, 2013

(54) MANAGING A NETWORK FLOW USING APPLICATION CLASSIFICATION INFORMATION AND ACTIVE SIGNALING RELAY

(75) Inventors: Jerome Pascal Moisand, Arlington, MA (US); Steven Onishi, Groton, MA (US); Mathias Kokot, Medford, MA (US); Denis Henk DeRuijter, Harvard, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 328 days.

This patent is subject to a terminal disclaimer.

(21) Appl. No.: 12/846,205

(22) Filed: Jul. 29, 2010

(65) Prior Publication Data

US 2010/0309786 A1  Dec. 9, 2010

Related U.S. Application Data

(63) Continuation of application No. 10/910,484, filed on Aug. 3, 2004, now Pat. No. 7,769,875.

(51) Int. Cl.
*G06F 11/00* (2006.01)
*G06F 15/173* (2006.01)
*G06F 15/16* (2006.01)

(52) U.S. Cl.
USPC ........... 370/235; 709/226; 709/236; 709/242; 709/243

(58) Field of Classification Search
USPC ....................................................... 370/235
See application file for complete search history.

(56) References Cited

U.S. PATENT DOCUMENTS

| | | | |
|---|---|---|---|
| 6,446,200 B1 | 9/2002 | Ball et al. | |
| 6,452,915 B1 | 9/2002 | Jorgensen | |
| 6,539,425 B1 | 3/2003 | Stevens et al. | |
| 6,681,232 B1 | 1/2004 | Sistanizadeh et al. | |
| 7,684,432 B2 * | 3/2010 | Adamczyk et al. | 370/463 |
| 7,769,875 B1 | 8/2010 | Moisand et al. | |
| 2002/0049841 A1 | 4/2002 | Johnson et al. | |
| 2002/0065864 A1 | 5/2002 | Hartsell et al. | |
| 2002/0099855 A1 | 7/2002 | Bass et al. | |
| 2002/0141343 A1 | 10/2002 | Bays | |
| 2003/0088671 A1 | 5/2003 | Klinker et al. | |
| 2003/0115353 A1 | 6/2003 | Deryugin et al. | |
| 2004/0141462 A1 * | 7/2004 | Mistry et al. | 370/229 |
| 2004/0223500 A1 * | 11/2004 | Sanderson et al. | 370/395.53 |
| 2004/0230695 A1 * | 11/2004 | Anschutz et al. | 709/232 |
| 2006/0041666 A1 | 2/2006 | Karremans | |

* cited by examiner

*Primary Examiner* — Moustafa M Meky
*Assistant Examiner* — Blake Rubin
(74) *Attorney, Agent, or Firm* — Shumaker & Sieffert, P.A.

(57) ABSTRACT

Techniques for classifying and managing network flows associated with a network service using application classification information and active signaling relay are described. A network device, for example, includes a signaling interceptor and a network flow interface. The signaling interceptor monitors a communication between a customer device and an application server, and identifies a network flow associated with a network service provided to the customer device by the application server. The network flow interface applies a policy to the identified network flow. An active signaling relay module communicates with the application server using data injected within the signaling communications, and utilizes the injected data to further control the network flows and the delivery of the network service.

15 Claims, 5 Drawing Sheets

| SOURCE ADDRESS | DESTINATION ADDRESS | SOURCE PORT | DESTINATION PORT | PROTOCOL | CUSTOMER IDENTIFIER | POLICY IDENTIFIERS |
|---|---|---|---|---|---|---|
| 10.0.0.1 | 192.168.2.4 | 20 | 20 | FTP | 540452 | 6, 4, 13 |
| 10.0.0.1 | 192.168.2.4 | 80 | 80 | HTTP | 540452 | 2 |
| 10.0.0.1 | 192.168.6.0 | 5762 | 5762 | RTP | 1056 | 6, 7 |
| 192.168.6.0 | 10.0.0.1 | 7345 | 7345 | RTP | 1056 | 6, 7 |
| 10.0.0.1 | 192.168.8.1 | 10456 | 10456 | RTSP | 10456 | 1, 4, 6 |

FIG. 3

MANAGING A NETWORK FLOW USING APPLICATION CLASSIFICATION INFORMATION AND ACTIVE SIGNALING RELAY

This application is a Continuation of U.S. application Ser. No. 10/910,484, filed Aug. 3, 2004, the entire contents of which is incorporated herein by reference.

TECHNICAL FIELD

The invention relates to computer networks and, more particularly, to techniques for managing network flows within computer networks.

BACKGROUND

Service providers provide a variety of network-based services to subscribing customers. For example, an Internet Service Provider (ISP) provides access to the Internet, thereby allowing a customer to browse the World Wide Web (WWW), communicate via electronic mail (email), exchange electronic documents, and access remote network resources. Some service providers provide other types of services, such as Internet Protocol (IP) telephony, video conferencing, multimedia streaming, Voice on Demand (VoD), Video-Surveillance, Voice over Internet Protocol (VoIP) communications, IP-TV, and gaming networks.

Some service providers execute service contracts with customers and guarantee a certain level of Quality of Service (QoS). One manner in which service providers currently provide different QoS guarantees is by monitoring network traffic and applying policies based characteristics of the traffic, e.g., packet header information. For example, a service provider may select and apply specific QoS policies to network traffic based on the particular port numbers specified in packet header information of the traffic. Because port numbers are generally associated with certain types of services, this scheme allows the service providers to distinguish between certain types of traffic. For example, a service provider may prioritize Hyper Text Transfer Protocol (HTTP) traffic, which is associated with port 80, higher than File Transfer Protocol (FTP) traffic, which is associated with port 20.

However, this type of prioritization scheme is relatively inflexible, and is generally inapplicable to many types of services due to the fact that many services dynamically assign port numbers. For example, many services that are established by a signaling protocol or other "real-time" media delivery protocols, e.g. Session Initiated Protocol (SiP), Real Time Streaming Protocol (RTSP), Real-time Transport Protocol (RTP), H.323, and Media Gateway Control Protocol (MGCP), dynamically assign port numbers for communication of the media application.

SUMMARY

In general, the invention is directed to techniques for classifying and managing individual network flows using application classification information. A network device, such as an edge router or broadband remote access server (BRAS), may utilize the techniques to apply application-specific policies to the individual network flows, authenticate customers associated with the network flows, provide proper accounting for the individual network flows, or perform other application-specific operations. As examples, the network device may select and apply application-specific policies to control and perform traffic classification, packet queuing, rate-limiting operations, Type of Service (TOS) stamping, or other management operations.

In practice, the network device monitors application service requests from a customer, and forwards the application service request to an application server. Moreover, the network device generates application classification information based on the monitored application service requests and any further signaling communication between the application server and the customer.

Using the application classification information, the network device manages one or more network flows, i.e., the network service, between the customer and the application server. In this manner, the network device actively monitors the delivery of services between service providers and their customers, and is able to individually control the specific flows associated with the provided network services. For example, the network device may select and apply an appropriate flow-specific policy to a given network flow based on the application classification information associated with that network flow. The network device may, for example, apply a QoS policy in order to provide a QoS guarantee to the customer in accordance with terms of the particular customer's service contract with the service provider.

The invention may provide additional control over the traffic flows by using active signaling relay techniques. In this case, the network device or an application server injects data into signaling communications that flow between the subscriber and the application server. In particular, the network device may inject data into upstream signaling communications or the application server may inject data into downstream signaling communications. The injected data, which could include resource availability information, may allow the application service provider to make better decisions about denying or accepting application service requests. Moreover, the injected data may include encrypted tokens, which may provide further control over network flow management.

In this manner, the techniques allow a network device and a service provider to provide end-to-end QoS guarantees for different types of network flows associated with network services, including those network services that utilize dynamic port assignments. For example, the network device and the service provider may apply the techniques to provide QoS guarantees for a variety of services, such as Internet Protocol (IP) telephony, video conferencing, multimedia, Voice on Demand (VoD), Video-Surveillance, Voice over Internet Protocol (VoIP), IP-TV, gaming networks, and other network services.

In one embodiment, a method comprises monitoring a communication between a customer device and an application server with an intermediate network device, wherein the communication is associated with a network service provided by the application server. The method further comprises identifying with the intermediate device a network flow associated with the network service, and applying a policy to the identified network flow with the intermediate network device.

In another embodiment, a method comprises receiving with an application server a communication from a customer device requesting a network service provided by the application server. The method further comprises extracting from the communication data that was injected by an intermediate network device, and controlling the delivery of the network service from the application server to the customer device based on the extracted data.

In another embodiment, a network device comprises a signaling interceptor to monitor a communication between a customer device and an application server, and identify a network flow associated with a network service provided to the customer device by the application server. The network device further comprises a network flow interface that applies a policy to the identified network flow.

In another embodiment, a computer-readable medium comprises instructions that cause a programmable processor to forward signaling communications between a customer and an application service provider, wherein the communication is associated with a network service provided by the application service provider. The instructions further cause the processor to communicate with the application service provider using data injected within the signaling communications, and apply a policy to network flows associated with the delivery of the network service to the customer by the application service provider.

In another embodiment, a computer-readable medium comprises instructions that cause a processor of a network device to exchange signaling communications with a customer device to establish the delivery of a network service to the customer device, and communicate with an edge device associated with the customer device using data injected within the signaling communications.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 3 is a block diagram illustrating an example embodiment of application classification information maintained by the network device shown in FIG. 2.

DETAILED DESCRIPTION

Figure 1:
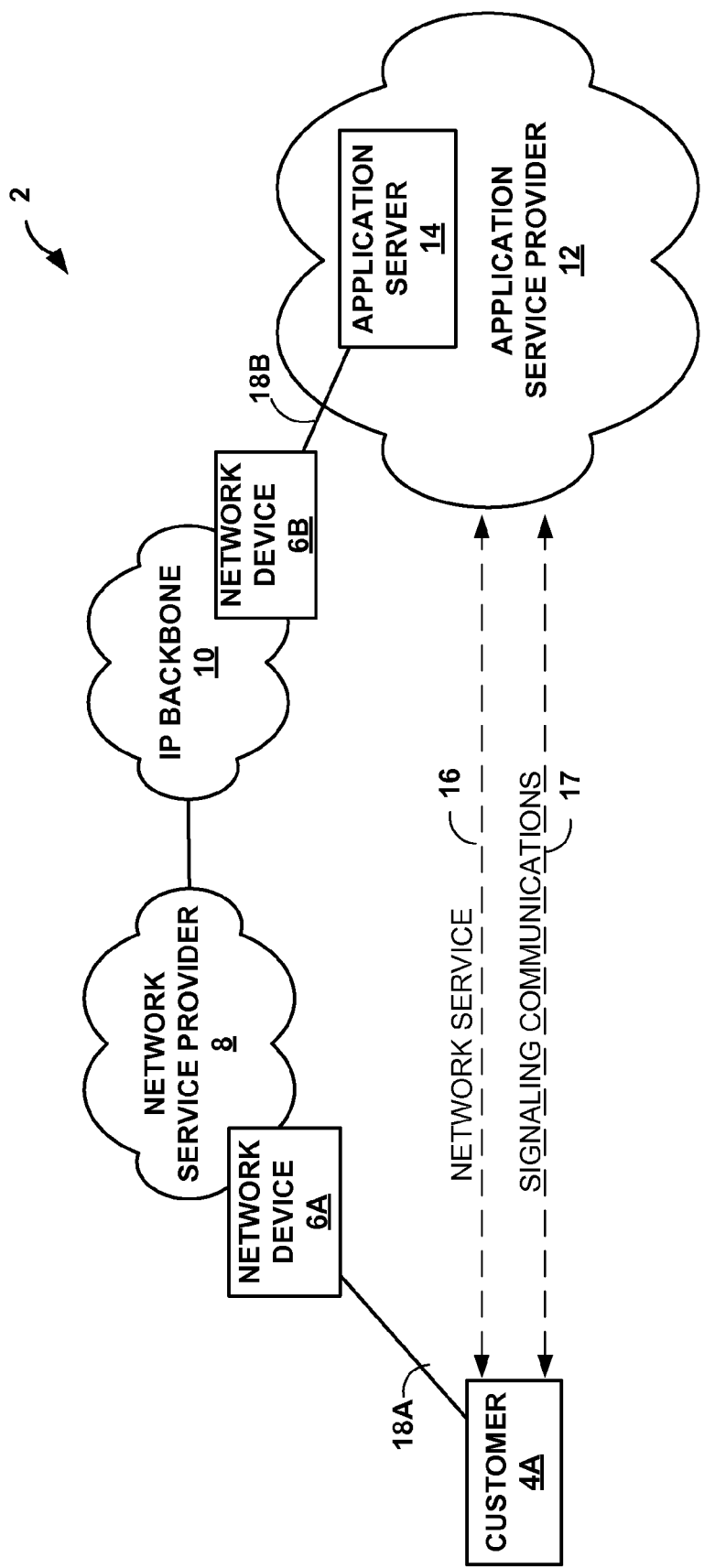
FIG. 1 is a block diagram illustrating an example system for classifying and managing individual network flows using application classification information associated with the network flows.

FIG. 1 is a block diagram illustrating an example system in which an application service provider (ASP) 12 delivers at least one network service 16 to customer 4A. Example network services that ASP 12 may deliver include network Internet Protocol (IP) telephony, video conferencing, multimedia, Voice on Demand (VoD), Video-Surveillance, Voice over Internet Protocol (VoIP), IP-TV, gaming networks or other services. ASP 12 may include a number of application servers, such as application server 14, for delivery of network service 16. Although network service 16 is physically communicated through system 2, for simplicity, the network service is also illustrated in FIG. 1 as a logical communication between customer 4A and ASP 12. Moreover, network service 16 is illustrated as bi-directional as some services, e.g., VoIP, may include upstream and downstream network flows.

In the exemplary embodiment of FIG. 1, network service provider (NSP) 8 provides network connectivity by which customer 4A receives network service 16 from ASP 12. Customer 4A may be a residential consumer, a Small Office/Home Office (SOHO), an office branch, a remote office, or other site. Typically, customer 4A pays for a network access subscription that allows customer 4A to access NSP 8. In addition, customer 4A enters a service contract to receive the network services from ASP 12.

Customer 4A communicates with a network device 6A of NSP 8 via link 18A, which may be a broadband connection such as a digital subscriber line (DSL), cable or fiber optic connection. Other example connections include broadband access, circuit aggregation, Code-Division Multiple Access (CDMA), General Packet Radio Service (GPRS), Passive Optical Network (PON), Metro-Ethernet or other network connections.

Network device 6A may be an edge router, a Broadband Remote Access Server (BRAS), or other device that controls the delivery of network services to customer 4A. Although not illustrated in FIG. 1, one or more devices may be coupled between network device 6A and customer 4A. For example, network device 6A may be coupled to a data link layer device, which may in turn be coupled to a subscriber device associated with customer 4A. The data link layer device may include a switch or a customer premise equipment (CPE) device, a Digital Subscriber Line Access Module (DSLAM) or a Cable Modem Termination System (CMTS).

In some embodiments, communication between network layer device 6A, the data link layer device, and the subscriber device may be via Asynchronous Transfer Mode (ATM) Virtual Circuits (VCs), or a combination of ATM VCs and Virtual Local Area Networks (VLANs). In other embodiments, the data link layer device may be an Ethernet Bridge, and communication between network layer device 6A, the data link layer device, and the subscriber device may be via Ethernet frames in accordance with the IEEE 802.3 family of standards.

NSP 8 provides customer 4A with connectivity to one or more core networks of the Internet, represented generally as Internet Protocol (IP) backbone 10. In similar fashion, ASP 12 is coupled to IP backbone 10, e.g., via network device 6B and link 18B, for communication of network services to and from the IP backbone.

In accordance with the principles of the invention, a network device, such as network device 6A or network device 6B, applies the techniques described herein for classifying and managing individual network flows associated with network service 16 using application classification information. Network device 6A, for example, may utilize the techniques to apply application-specific policies to the individual network flows associated with network service 16, authenticate customer 4A associated with the network flows, provide proper accounting for the individual network flows, or perform other "application-specific" operations (i.e., operations specific to a particular type of service, ASP, and/or customer) to individual network flows. As examples, network device 6A may select and apply application-specific policies to control and perform traffic classification, packet queuing, rate-limiting operations, Type of Service (TOS) stamping, or other management operations. Although described herein with reference to network device 6A, the techniques may be applied by other network devices within system 2, such as network device 6B or other devices within NSP 8, IP backbone 10 or ASP 12.

As described in further detail below, network device 6A monitors signaling communications 17 between customer 4A and ASP 12 used in establishing the delivery of network service 16. Like network service 16, signaling communications 17 are physically communicated through system 2, but are illustrated as logical communications directly between customer 4A and ASP 12 for purposes of illustration. In particular, network device 6A monitors application service requests from customer 4A to ASP 12, as well as any further signaling communications 17 between ASP 12 and customer 4A. Based on the signaling communications 17, network device 6A generates application classification information that uniquely identifies network service 16. Exemplary signaling protocols used by customer 4A and ASP 12 to establish delivery of network service 16 include the Session Initiated Protocol (SiP), Real Time Streaming Protocol (RTSP), Real-time Transport Protocol (RTP), H.323, and Media Gateway Control Protocol (MGCP).

In this sense, network device 6A may be viewed as having a certain degree of "application-level awareness," and monitors signaling communications 17 to classify and manage individual network flows in view of the associated network service being provided. For example, network device 6A may utilize the application classification information to identify traffic associated with network service 16, and may select and apply one or more appropriate application-specific policies to the identified traffic. The network device may, for example, apply QoS policies in order to provide a QoS guarantee to customer 4A in accordance with terms of a service contract between customer 4A and ASP 12. In this manner, network device 6A actively monitors the delivery of network services, (e.g., network service 16), between ASP 12 and its customers (e.g., customer 4A), and is able to individually control the specific flows associated with the provided network services.

In further embodiments described below, network device 6A operates as an "active signaling relay" to provide additional control over network service 16. In particular, transparently to customer 4A, network device 6A may inject data within upstream flows of signaling communications 17 to actively communicate with ASP 12. In addition, ASP 12 injects data into downstream flows of signaling communications 17 to communicate with network device 6A. As described in further detail, this mechanism allows network device 6A and ASP 12 to share information related to customer 4A and the particular network service 16 being provided, thereby allowing the network device and the ASP to better control delivery of the network service.

For exemplary purposes, ASP 12 and NSP 8 have been illustrated as separate entities. The techniques described herein, however, may readily be applied in environments in which ASP 12 and NSP 8 are co-located and/or operate as a common entity.

Figure 2:
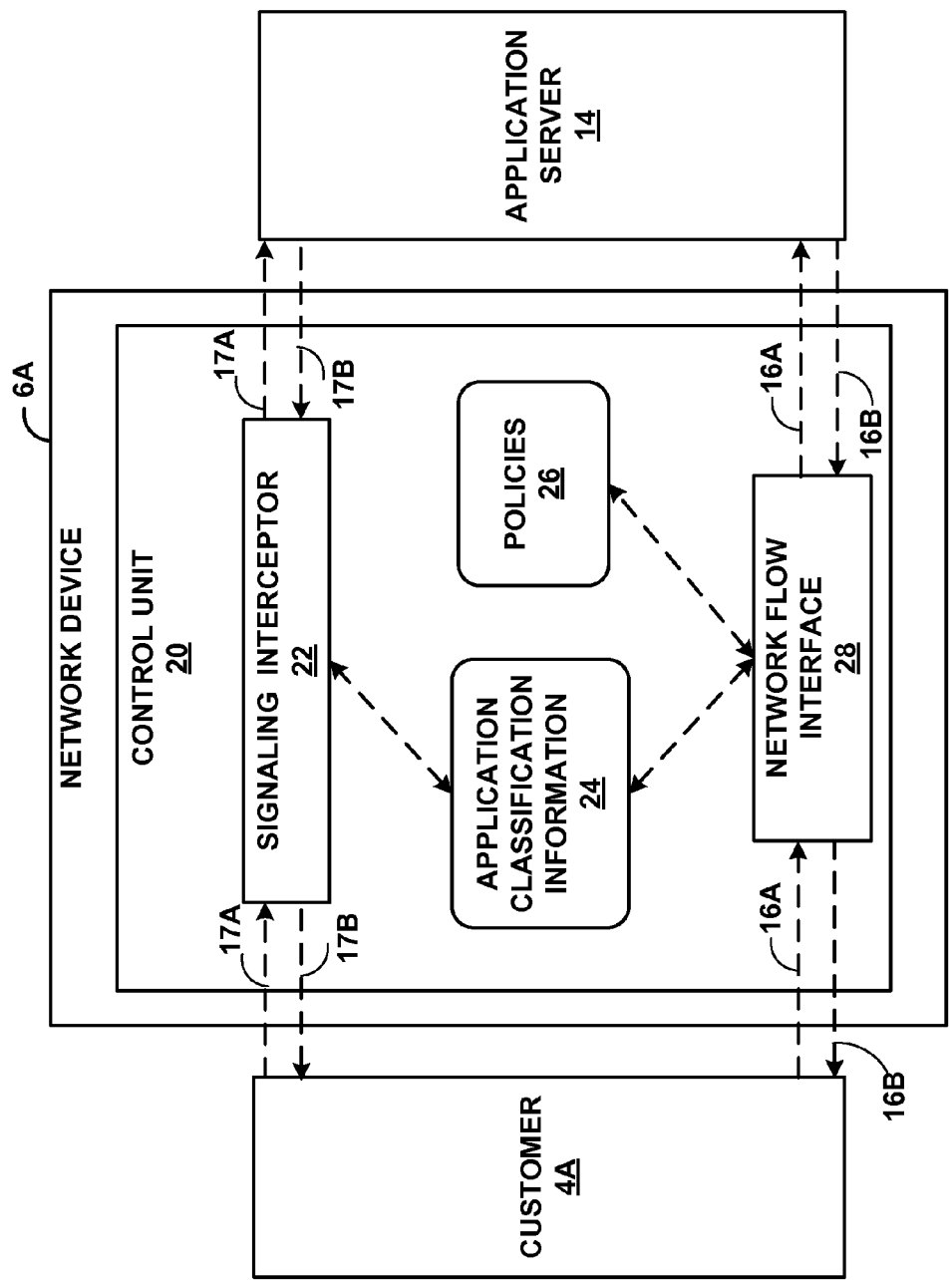
FIG. 2 is a block diagram illustrating an example embodiment of a network device from FIG. 1.

FIG. 2 is a block diagram illustrating an example embodiment of network device 6A from FIG. 1. In the illustrated embodiment, network device 6A includes a control unit 20, which further includes a signaling interceptor 22, application classification information 24, QoS policies 26, and a network flow interface 28.

Signaling interceptor 22 of network device 6A monitors signaling communications 17 (FIG. 1), which are illustrated in FIG. 2 as comprising upstream signaling communications 17A and downstream signaling communications 17B. In particular, signaling interceptor 22 supports one or more signaling protocols, and transparently intercepts upstream and downstream signaling communications 17A, 17B and forwards the communications between customer 4A and application server 14.

Similar to the illustration of network service 16 and signaling communications 17 in FIG. 1 as logical connections, upstream and downstream flows 16A, 16B, and upstream and downstream signaling communications 17A, 17B are illustrated logically as separate flows and communications even though they may travel over the same physical interfaces or links in system 2.

Signaling interceptor 22 maintains application classification information 24 based on the intercepted upstream and downstream signaling communications 17A, 17B. In particular, signaling interceptor 22 maintains application classification information 24 to uniquely identify the network services delivered by ASP 12 and, in particular, the specific network flows associated with those services. In the example of FIG. 2, signaling interceptor 22 maintains application classification information 24 to uniquely identify upstream network flow 16A and downstream network flow 16B associated with network service 16 (FIG. 1).

Signaling interceptor 22 updates application classification information 24 upon intercepting a network service request from customer 4A. Signaling interceptor 22 may update application classification information 24 based on, for example, IP address information and/or port information contained with the intercepted request and any subsequent signaling communications between customer 4A and application server 14. By intercepting and monitoring upstream and downstream signaling communications 17A and 17B, signaling interceptor 22 tracks the specific flows associated with the delivery of network services despite the fact that the flows may utilize dynamically-assigned port numbers. In one embodiment, signaling interceptor 22 generates application classification information for customers, such as customer 4A, that have a pre-existing contractual relationship with ASP 12 for delivery of network services.

Upon detecting the delivery of a new network service, control unit 20 updates application classification information 24 to identify the associated network flows, e.g., upstream and downstream network flows 16A and 16B, and maps one or more policies 26 to the network flows. Network flow interface 28 communicates upstream and downstream network flows 16A and 16B between customer 4A and application server 14. Moreover, network flow interface 28 selects and applies one or more policies 26 to upstream and downstream network flows 16A and 16B based on the application classification information 24 associated with that network flow. In this manner, network flow interface 28 may apply one or more of policies 26 based on a variety of factors, such as the type of network service being provided, the particular customer 4A receiving the network service, the particular ASP 12 providing the service, or combinations thereof.

As examples, network device 6A may select and apply policies 26 to control and perform traffic classification, packet queuing, rate-limiting operations, Type of Service (TOS) stamping, or other management operations for network services provided by ASP 12. As another example, network device 6A can apply one or more of policies 26 in order to provide a QoS guarantee to customer 4A in accordance with terms of the customer's service contract with ASP 12.

FIG. 3 is a block diagram illustrating an example embodiment of application classification information 24 within network device 6A shown in FIG. 2. In this example embodiment, each entry, i.e. row, within application classification information 24 uniquely corresponds to a different network flow, e.g., upstream network flow 16A or downstream network flow 16B. For each detected network flow, application classification information 24 specifies network flow information 30, customer identifier 32, and QoS policies 34 to be applied.

Network flow information 30 describes flow characteristics of an individual network flow and uniquely identifies the flow. For example, network flow information 30 may include information such as a source address, destination address, source port, destination port, protocol or other information. As shown, application classification information 24 maps network flow information 30 to a corresponding customer identifier 32, and to one or more of policy identifiers 34. Customer identifier 32 specifies an identification code for a customer, e.g., customer 4A, associated with the particular network flow. Policy identifiers 34 specify one or more identifiers for policies to be applied to the respective network flow. Each of the policy identifiers 34 corresponds to a respective one of policies 26 (FIG. 2), and thereby maps the identified network flow to one of the policies.

As shown in the example of FIG. 3, application classification information 24 specifies five network flows, including two VoIP flows 35 and 37, which are associated with a single VoIP session. In particular, VoIP flow 35 is a downstream VoIP flow defined by a source address of 10.0.0.1, a destination address of 192.168.6.0, a source port of 5762, a destination port of 5762, and the RTP protocol. VoIP flow 37 is an upstream VoIP flow defined by a source address of 192.168.6.0, a destination address of 10.0.0.1, a source port of 7345, a destination port of 7345, and the RTP protocol. For each of VoIP flows 35, 37, application classification information 24 further specifies a customer identifier 1056, and policy identifiers 6 and 7 for policies to be applied to the flows. Flow interface module 28 applies the particular policies 26 associated with policy identifiers '6' and '7' to network traffic that matches the characteristics defined for VoIP flows 35 and 37, thereby allowing network device 6A to individually manage the network flows associated with the VoIP network service.

Figure 4:
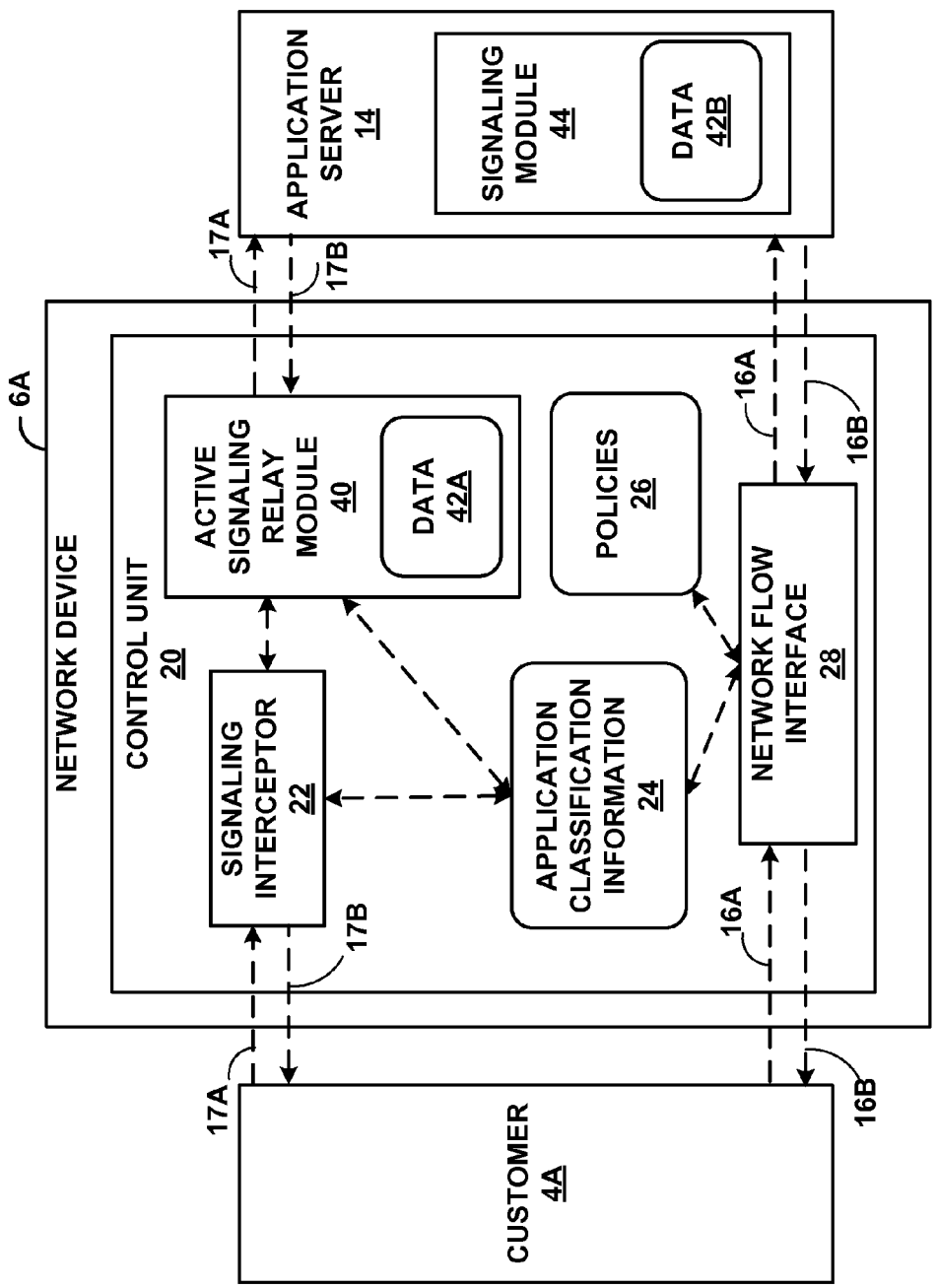
FIG. 4 is a block diagram illustrating an example embodiment of a network device that utilizes active signaling relay to communicate with an application server.

FIG. 4 is a block diagram illustrating an example embodiment of network device 6A that utilizes active signaling relay to communicate with application server 14. In particular, network device 6A operates in a manner similar to the operation described above, but further includes an active signaling relay module 40.

With active signaling relay module 40, as with embodiments described above, customer 4A issues an application service request to application server 14 via network device 6A. As described above, signaling interceptor 22 of network device 6A transparently intercepts upstream and downstream signaling communications 17A and 17B, and generates application classification information 24 based on the intercepted communications.

In the embodiment shown in FIG. 4, active signaling relay module 40 injects data 42A into upstream signaling communications 17A from customer 4A to application server 14. Application server 14 extracts the injected data, i.e. data 42A, and utilizes the data to control delivery of network service 16. As one example, data 42A may specify a customer identifier or other site information associated with customer 4A, and application server 14 may utilize the customer number for improved routing of high priority calls, such as 911 emergency calls, or call admission control. Data 42A may be considered reliable and trusted because it was injected by network device 6A, rather than an untrusted and potentially malicious entity. Based on the trusted site information provided by active signaling relay module 40, for example, application server 14 may control the number of VoIP calls allowed for a particular customer.

As another example, active signaling relay module 40 may inject data 42A that specifies information related to the physical resources available to customer 4A. In one example, data 42A may specify the characteristics related to the connection by which customer 4A connects to network device 6A. This information may include the type of connection (e.g., cable, DSL, T1), connection speed or bandwidth. The information may also describe current loading conditions experienced by network device 6A with respect to one or more customers of application server 14. With this information, application server 14, which is typically remote from network device 6A and customer 4A, may make improved decisions, such as decisions related to accepting or denying requests, bandwidth allocation, scheduling, or other decisions related to delivery of network service 16.

In addition, application server 14 may inject downstream data for communication with network device 6A. In one embodiment, signaling module 44 of application server 14 injects data, i.e. data 42B, into downstream signaling communication 17B. Data 42B may take the form of one or more tokens, which may include information that is encrypted and/or digitally signed. The information, which may be encrypted in such a way that it is unknown to customer 4A, is targeted for network device 6A.

Active signaling relay module 40 of network device 6A receives the tokens from application server 14, and verifies that the sender of the network flow, i.e. application server 14, is a trusted source. Active signaling relay module 40 receives the tokens and performs an appropriate action based on the received data, such as updating application classification information 24 and, in particular, the policies 26 to be applied to the particular network flows.

As one example, signaling module 44 of application server 14 may inject data 42B that specifies characteristics of a service contract between customer 4A and ASP 12. For example, the injected data 42B may specify a level of QoS guaranteed by ASP 12, the types of network services available to the customer, or other characteristics of the service contract. Based on the characteristics, active signaling relay module 40 selects the appropriate policies 26 for application to upstream and downstream network flows 16A and 16B by network flow interface 28 in order to best meet the QoS guarantees agreed upon by application service provider 10 and customer 4A.

As another example, signaling module 44 may inject data 42B into downstream signaling communication 17B specifying the lawful interception of network services, such as VoIP, provided to customer 4A. Upon receiving this information, network device 6A may enable lawful interception of network service 16, which may include initiating a mirroring process. In this case, network flow interface 28 of network device 6A applies policies 26 to mirror upstream and/or downstream network flows 16A and 16B.

As yet another example, signaling module 44 injects data 42B within downstream signaling communication 17B that designates upstream and downstream network flows 16A, 16B as associated with a high priority voice call, or even an emergency call. If application server 14 detects that a call is a priority call, signaling module 44 can send a token to network device 6A that identifies upstream and downstream network flows as a priority call. In response, network device 6A can process the call in an appropriate manner. Network flow interface 28 may, for example, process a high-priority call, such as a 911 call, to reduce delay in accepting and connecting the call, and to ensure that the call is not dropped.

Although the embodiments described inject data from stored data 42A and 42B, in other embodiments the injected data may be calculated or otherwise developed by active signaling relay module 40 or signaling module 44. Alternatively, the injected data may be a combination of calculated data and data stored in either data 42A or data 42B.

Figure 5:
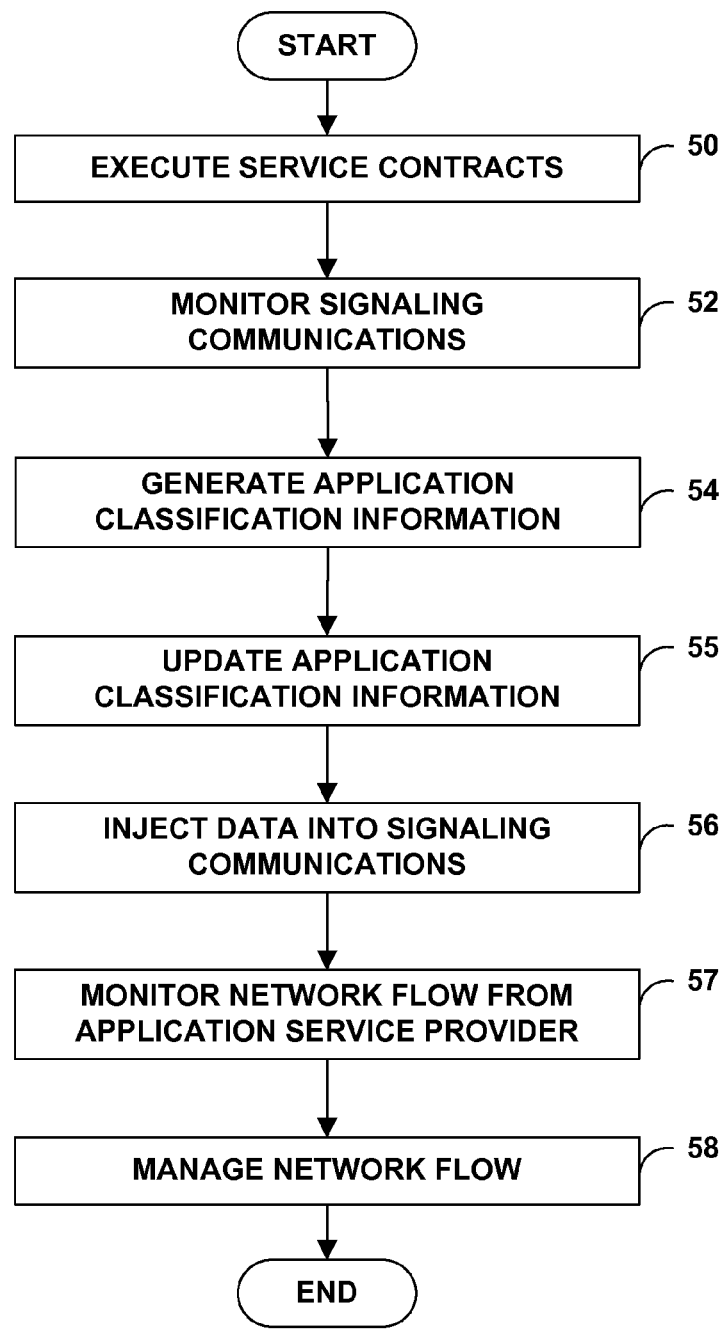
FIG. 5 is a flow diagram illustrating an example technique for managing an individual network flow by using application classification information associated with the network flow.

FIG. 5 is a flow diagram illustrating an example technique for managing an individual network flow by using application classification information associated with the network flow. For exemplary purposes, the flow diagram of FIG. 5 will be described in reference to the block diagram of FIG. 4.

Initially, business relationships are typically established between customer 4A, NSP 8, and/or ASP 12. For example, service contracts may be executed between customer 4A and NSP 8A for Internet access, between customer 4A and ASP 12 for one or more network services, such as VoIP, and possibly between NSP 8 and APS 12 (50).

Next, customer 4A and ASP 12 engage in signaling communications 17 to establish the delivery of network service 16. Network device 6A, or more specifically, a signaling interceptor 22 (FIG. 4) of network device 6A, monitors signaling communications 17 (52). In particular, signaling interceptor 22 transparently intercepts upstream and downstream signaling communications 17A, 17B and forwards the communications between customer 4A and application server 14.

Based on signaling communications 17, network device 6A generates application classification information that uniquely identifies network service 16 (54). In one embodiment, the application classification information may include network flow information, and corresponding QoS policies and customer 4A identifiers. Network device 6A maintains application classification information 24 based on the intercepted signaling communications. In particular, network device 6A maintains application classification information 24 to uniquely identify the network services delivered by ASP 12 and, in particular, the specific network flows associated with those services.

Network device 6A updates application classification information 24 (55) within network device 6A upon intercepting a network service request from customer 4A. In particular, network device 6A may update application classification information 24 based on, for example, IP address information and/or port information contained with the intercepted request and any subsequent signaling communications between customer 4A and application server 14. By intercepting and monitoring signaling communications, network device 6A tracks the specific flows associated with the delivery of network services despite the fact that the flows may utilize dynamically-assigned port numbers.

In some embodiments, the network device operates as an "active relay" to provide an additional control over network service 16. In particular, transparently to customer 4A, network device 6A may inject data (56) within upstream signaling communications 17A to actively communicate with ASP 12. In addition, ASP 12 may inject data into downstream signaling communications 17B to communicate with network device 6A. In this manner, network device 6A and ASP 12 share information related to customer 4A and the particular network service 16 being provided, thereby allowing the network device and the ASP to better control delivery of the network service.

After establishing application classification information 24 based on signaling communications 17 between the customer 4A and application server 14, network flow interface 28 monitors network traffic and identifies those network flows having traffic characteristics that match the application classification information (57). Network device 6A manages the identified network flows (58), which may include selecting and/or applying application-specific policies 26 to control and perform traffic classification, packet queuing, rate-limiting operations, accounting operations, Type of Service (TOS) stamping, or other management operations. For example, network device 6A can apply one or more of policies 26 in order to provide a QoS guarantee to customer 4A in accordance with terms of the customer's service contract with ASP 12. In this manner, network device 6A may apply one or more application-specific policies based on a variety of factors, such as the type of network service being provided, the particular customer 4A receiving the network service, the particular ASP 12 providing the service, or combinations thereof.

Various embodiments of the invention have been described. The techniques and embodiments described herein may be implemented in hardware, software, firmware, or any combination thereof. If implemented in software, the techniques may be directed to a computer-readable medium in a network device that comprises program code that, when executed, causes the device to perform one or more of the techniques described herein. A network device, for example, may include one or more processors which access the instructions stored on the computer-readable medium, and execute the instructions in order to perform one or more the techniques described herein. In addition, although the techniques have been described as elements embodied within a single device, the described elements may be distributed to multiple devices. These and other embodiments are within the scope of the following claims.

The invention claimed is:

1. A method comprising:
receiving, with an application server, an upstream signaling communication requesting a network service provided by the application server, the upstream communication being forwarded by an intermediate network device from a customer device to the application server;
with the application server, extracting from the received upstream signaling communication first data that was injected by the intermediate network device;
controlling, with the application server, the delivery of the network service from the application server to the customer device based on the extracted first data;
issuing, with the application server, a downstream communication for delivery to the customer device via the intermediate network device so as to establish a session for the delivery of the network service; and
injecting within the downstream communication, with the application server, second data to control application of one or more policies to the network service by the intermediate device, the injected second data being different from the extracted first data.

2. The method of claim 1, wherein the second data injected into the downstream communication by the application server specifies characteristics of a service contract between an application service provider and a customer to control application of one or more policies to the network service by the intermediate device.

3. The method of claim 1, wherein the second data injected into the downstream communication by the application server indicates a lawful interception of the network service by the intermediate network device.

4. The method of claim 1, wherein the second data injected into the downstream communication by the application server indicates the network service is associated with a high priority voice call to direct the intermediate device to prioritize the network service in response to the injected data.

5. The method of claim 1, further comprising encrypting the extracted data using a cryptographic key.

6. The method of claim 1, wherein the upstream signaling communication conforms to a signaling protocol.

7. The method of claim 6, wherein the upstream signaling protocol is one of a Session Initiated Protocol (SiP), a Real Time Streaming Protocol (RTSP), a Real-time Transport Protocol (RTP), a H.323 protocol, or a Media Gateway Control Protocol (MGCP).

8. The method of claim 1, wherein the intermediate network device comprises one of an edge router or a broadband remote access server (BRAS) that provides network access to the customer device.

9. A method comprising:
injecting, with an intermediate network device positioned between a customer device and an application server, first data into an upstream communication sent from the customer device for delivery to the application server;
receiving, with the intermediate network device, a downstream signaling communication sent from the application server for delivery to the customer device, wherein the downstream signaling communication is (i) associated with and (ii) used in establishing delivery of a network service provided by the application server to the customer device;
extracting second data from the downstream signaling communication with the intermediate network device, wherein the extracted second data is injected into the downstream signaling communication with the application server, wherein the extracted second data is different from the first data injected with the intermediate network device;
forwarding, with the intermediate network device, the downstream signaling communication to the customer device;
identifying with the intermediate network device a network flow between the application server and the customer device that is associated with the network service;
mapping the identified network flow to a policy associated with the customer device; and
controlling the delivery of the network flow to the customer device with the intermediate network device based at least in part on the extracted data by applying the policy to the network flow.

10. The method of claim 9, wherein the extracted second data specifies characteristics of a service contract between an application service provider and a customer to control application of one or more policies to the network service by the intermediate network device.

11. The method of claim 9, wherein the extracted second data indicates a lawful interception of the network service by the intermediate network device.

12. The method of claim 9, wherein the extracted second data indicates the network service is associated with a high priority voice call to direct the intermediate network device to prioritize the network service in response to the extracted second data.

13. The method of claim 9, wherein the intermediate network device is a router and the extracted second data controls the application of one or more policies to the network service by the router.

14. An application server device comprising:
a memory; and
one or more programmable processors configured to:
receive an upstream signaling communication requesting a network service provided by the application server, the upstream communication being forwarded by an intermediate network device from a customer device to the application server;
extract, from the received upstream signaling communication, first data that was injected by the intermediate network device;
control the delivery of the network service from the application server to the customer device based on the extracted first data;
issue a downstream communication for delivery to the customer device via the intermediate network device so as to establish a session for the delivery of the network service; and
inject, within the downstream communication, second data to control application of one or more policies to the network service by the intermediate device, the injected second data being different from the extracted first data.

15. A non-transitory computer-readable storage medium encoded with instructions that, when executed, cause one or more programmable processors of an application server to:
receive an upstream signaling communication requesting a network service provided by the application server, the upstream communication being forwarded by an intermediate network device from a customer device to the application server;
extract, from the received upstream signaling communication, first data that was injected by the intermediate network device;
control the delivery of the network service from the application server to the customer device based on the extracted first data;
issue a downstream communication for delivery to the customer device via the intermediate network device so as to establish a session for the delivery of the network service; and
inject, within the downstream communication, second data to control application of one or more policies to the network service by the intermediate device, the injected second data being different from the extracted first data.

* * * * *